United States Patent [19]

Kelly

[11] Patent Number: 4,552,122
[45] Date of Patent: Nov. 12, 1985

[54] PORTABLE APPARATUS FOR SHAPING GLASS BY ABRASION

[76] Inventor: John M. Kelly, 131 Sugartown Rd., Devon, Pa. 19333

[21] Appl. No.: 562,487

[22] Filed: Dec. 16, 1983

[51] Int. Cl.$^4$ .............................................. B28D 1/04
[52] U.S. Cl. ..................................... 125/14; 51/241 S
[58] Field of Search ........... 51/241 S, 170 R, 170 PT; 125/13 R, 14

[56] References Cited

U.S. PATENT DOCUMENTS

| | | | |
|---|---|---|---|
| 1,910,748 | 5/1933 | Burk | 125/13 R |
| 1,961,540 | 6/1934 | Williams | 51/170 PT |
| 2,014,229 | 9/1935 | Emmons | 125/13 R |
| 2,528,511 | 11/1950 | Graham | 51/170 PT |
| 2,581,244 | 1/1952 | Donato | 51/241 S |
| 3,323,507 | 6/1967 | Schuman | 125/14 |
| 4,054,179 | 10/1977 | Destree | 125/14 |
| 4,305,344 | 12/1981 | Baskett | 51/241 S |

Primary Examiner—Harold D. Whitehead
Attorney, Agent, or Firm—Michael F. Petock

[57] ABSTRACT

A portable apparatus for shaping glass by abrasion utilizes a pneumatic motor carried by a carriage which travels along a track. A glass cutting abrasive blade is driven by a pneumatic motor and a fluid coolant spray, which coolant may be water, is directed to the abrading surface of the blade where it contacts the glass being shaped. Various shaping blades may be utilized for cutting, bevel edging, pencil edging and the like.

17 Claims, 10 Drawing Figures

U.S. Patent  Nov. 12, 1985  Sheet 1 of 3  4,552,122
FIG. 1
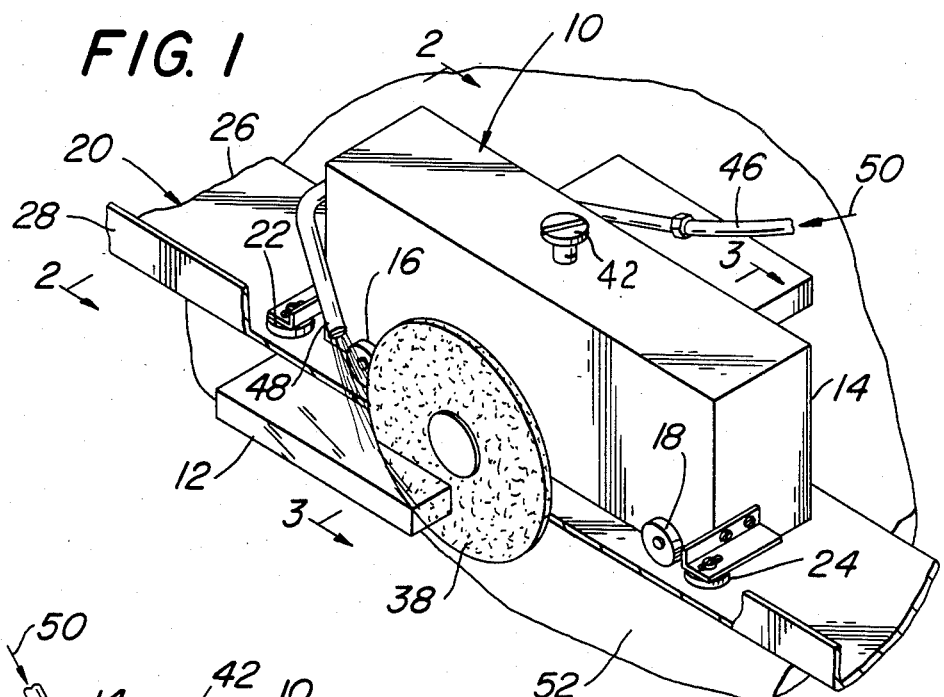
FIG. 2
FIG. 3
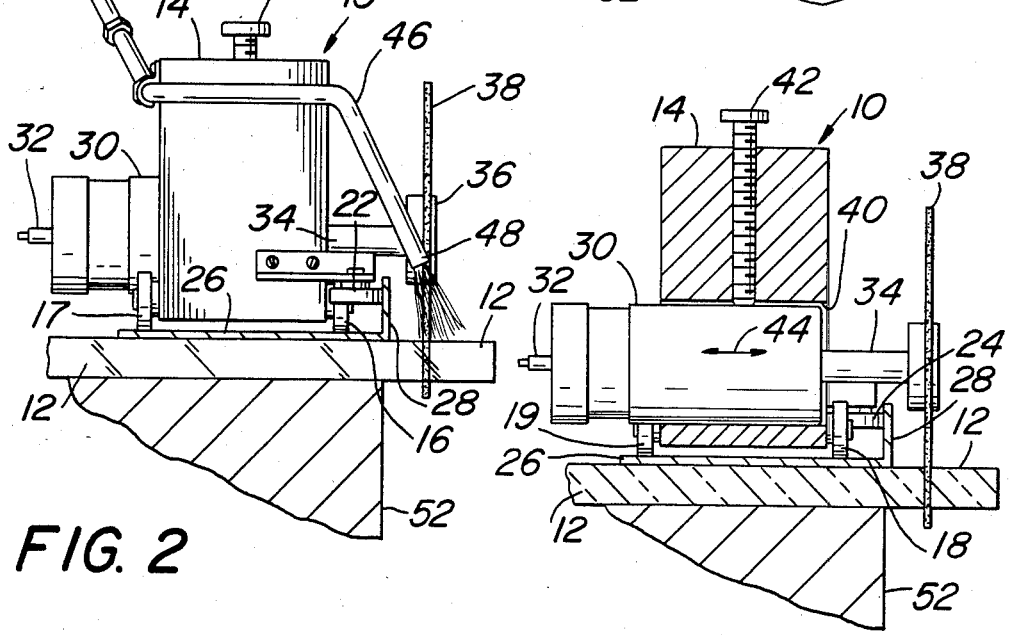

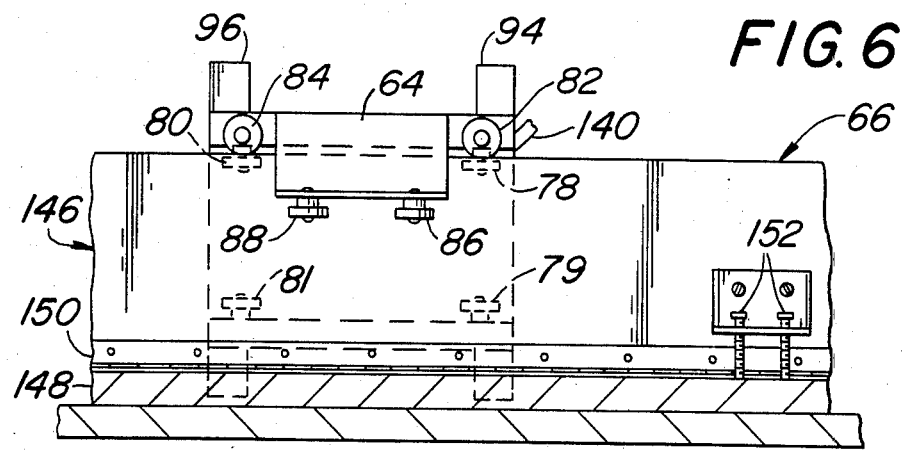
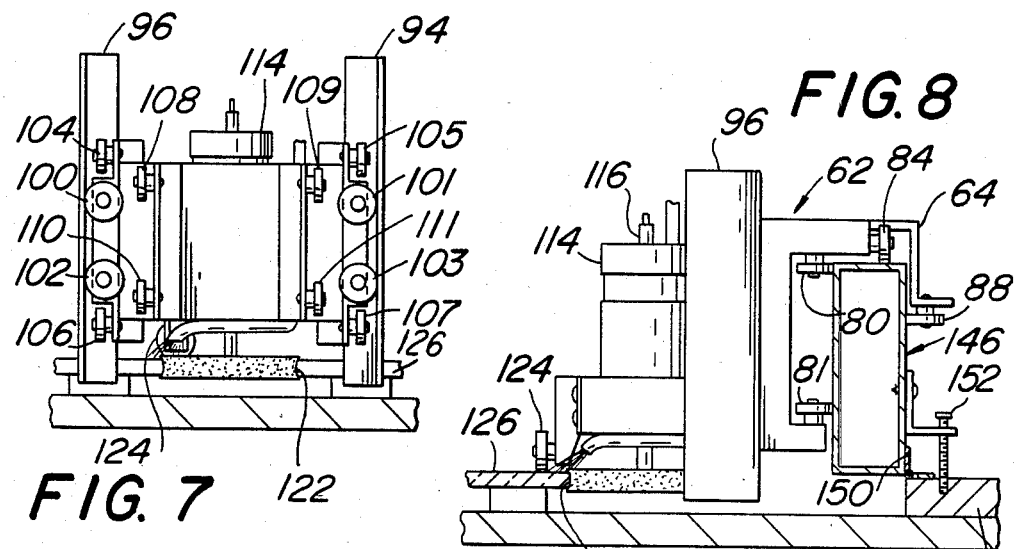
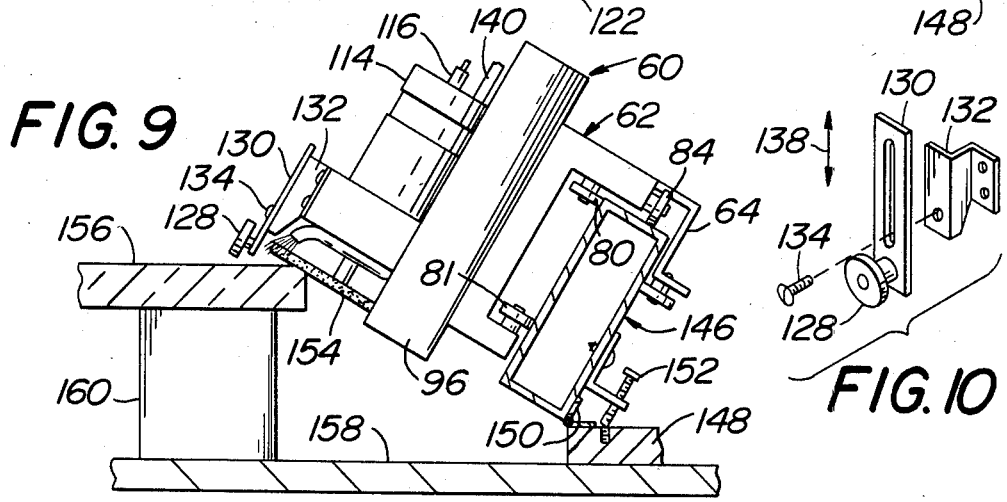

PORTABLE APPARATUS FOR SHAPING GLASS BY ABRASION

BACKGROUND OF THE INVENTION

The present invention relates to a portable apparatus for shaping glass by abrasion. More particularly, the present invention relates to a portable apparatus for shaping glass by abrasion wherein the glass may be shaped by cutting through the glass or by forming various shapes along the edge thereof such as beveling and rounding, which is known in the art as pencil edging.

A significant need has existed for a portable apparatus for shaping glass. It has been known in the past to break glass substantially along a straight line by scoring the glass sheet with a tool. Further, U.S. Pat. No. 2,750,674—Lee discloses an apparatus for scoring glass along a substantially straight line by utilizing such a scoring apparatus mounted on a guide rail by means of two pairs of wheels. However, this patent does not disclose any means of cutting a sheet of glass by utilizing an abrasive disk driven by a pneumatic motor nor does it disclose any means of shaping glass in other ways, such as beveling or rounding of edges. Further, large expensive machines weighing thousands of pounds in which sheets of glass are fed by the machine into a cutting or shaping apparatus may be in existence for use in factories. These machines cost many thousands of dollars and are not adaptable for use in small shops and in the field for due to, among other reasons, the lack of portability and the prohibitive cost.

SUMMARY OF THE INVENTION

The present invention provides a portable apparatus for shaping glass by abrasion wherein the unit may be transported with ease by a single person. The apparatus of the present invention may be utilized with significant advantage in glass fitting and working shops and at places of glass installation without difficulty.

The present invention provides a portable apparatus for shaping glass by abrasion which is economical and provides an economically feasible means of shaping glass, such as by cutting, beveling and rounding for use in various size glass shops.

The present invention provides the advantage that the glass cutting operation may be economically cooled by means of a water spray directed at the surface being shaped or cut without introducing an electric shock hazard.

Another advantage of the present invention is that it provides a means of shaping glass in a straight line, either by cutting, beveling or rounding the edge by means of running a carriage mounted pneumatic motor along a track. The lightweight pneumatic motor is run along the glass, and not the glass being fed or moved into a shaping surface of an abrasive blade. This is a significant advantage since much of the glass utilized for processing in this manner may be glass having a substantial thickness and weight, such as glass three-quarters of an inch thick utilized for table tops and the like.

Furthermore, in accordance with the present invention, significant adjustability is provided by the apparatus of the present invention to adapt to various shaping operations.

Briefly, in accordance with the present invention, a portable apparatus is provided for shaping glass by abrasion in which a carriage is provided with a plurality of guide means. The guide means of the carriage engage a track to enable movement of the carriage along the track. A pneumatic motor is carried by the carriage and a glass cutting abrasive blade is driven by the pneumatic motor for rotation. Fluid coolant spray means, preferably in the form of a water spray, is carried by the carriage and adapted to spray fluid coolant at the abrading surface of the cutting blade during glass abrading operations.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a perspective view of a portable glass cutting apparatus in accordance with the present invention.

FIG. 2 is a cross-sectional view taken along line 2—2 of FIG. 1.

FIG. 3 is a cross-sectional view taken along line 3—3 of FIG. 1.

FIG. 6 is an elevation view, partially in cross-section, taken along 6—6 of FIG. 5.

FIG. 7 is a cross-sectional view taken along line 7—7 of FIG. 5.

FIG. 8 is a side elevation view, partially in cross-section, taken along line 8—8 of FIG. 5.

FIG. 9 is a side elevation view, partially in cross-section, of the embodiment of the apparatus shown in FIG. 4 utilizing another glass cutting abrasive blade and positioned for a beveling operation.

FIG. 10 is a view in perspective of an alternate embodiment of a guide/stop means which may be utilized in the apparatus illustrated in FIGS. 4 through 9.

DETAILED DESCRIPTION OF THE PREFERRED EMBODIMENTS

Figure 4:
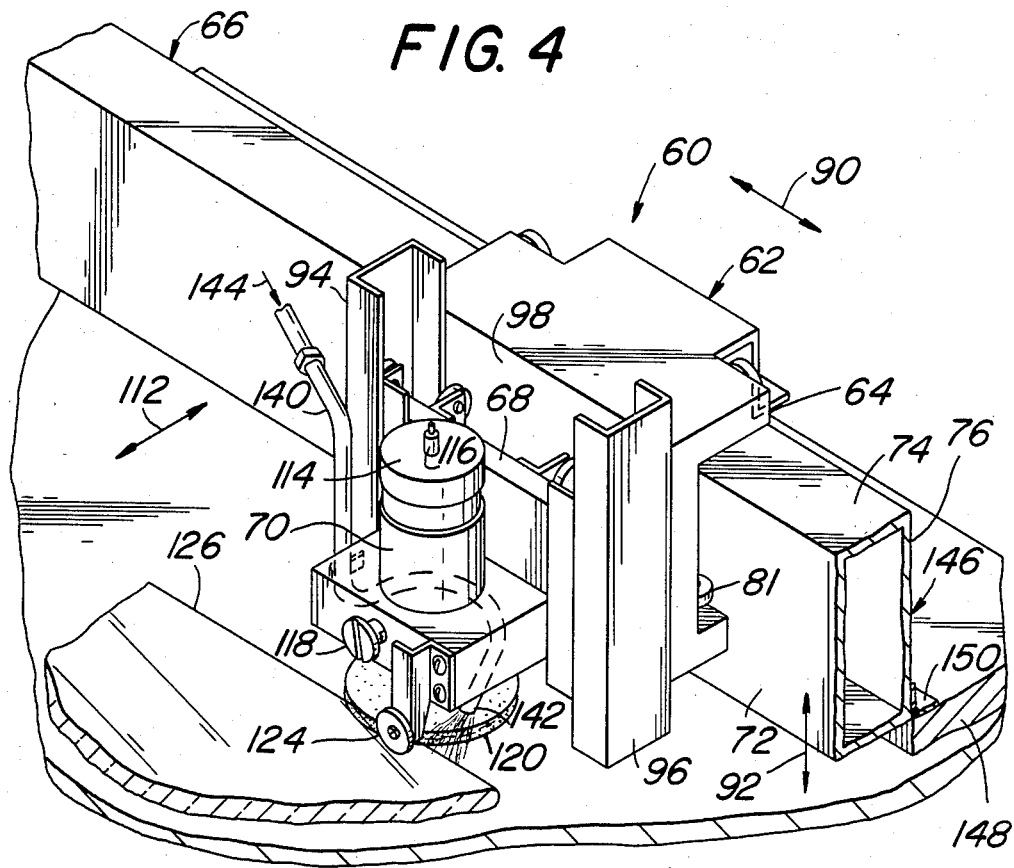
FIG. 4 is a view in perspective of another embodiment of the present invention.

Referring now to the drawings in detail, wherein like numerals indicate like elements, there is shown in FIG. 1 a view in perspective of a portable apparatus 10 for shaping glass or other like material by abrasion in accordance with the present invention. A piece of glass 12 being shaped by cutting is shown. It is understood throughout that although glass will be referred to herein for the purposes of illustration, other similar materials, including synthetic plastic materials may be shaped by utilizing the apparatus of the present invention. However, for purposes of illustration and for purposes of brevity and clarity, the word glass will be utilized throughout without specific reference to the fact that other materials may be shaped by the apparatus of the present invention.

Further referring to FIG. 1, there is shown a carriage 14 provided with guide means 16 through 19 as shown in FIGS. 1 through 3 for supporting and guiding carriage 10 on track 20. Carriage 14 is also provided with guide means 22 and 24. Guide means 16 through 19, 22 and 24 are preferably in the form of rollers to provide smooth movement of carriage 14 with a minimum of friction. However, it is understood that other suitable guide means may be utilized within the spirit of the present invention, such as, for example, projections comprised of a low friction synthetic material without moving parts.

Track 20 is preferably comprised of an "L" shape having a bottom portion 26 and a rising portion 28. Guide means or rollers 16 through 19 support carriage 14 on bottom portion 26 of track 20. Guide means or rollers 22 and 24 are caused to engage rising member 28 of track 20 as carriage 14 is moved along track 20. To prevent the possibility of scratching or otherwise marring the surface of glass plate 12 by track 20, a layer or segment of cork or other non-mar material may be bonded to the bottom surface of bottom portion 26 of track 20 so that it would appear between the bottom portion 26 of track 20 and glass plate 12 as shown in cross-section in FIGS. 2 and 3. (Not shown in the drawings). Alternatively, track 20 may be composed of a non-mar or relatively non-mar material such as a synthetic plastic material.

Pneumatic motor 30 is carried by carriage 14 as illustrated in FIGS. 1 through 3. Pneumatic motor 30 is provided with a compressed air input 32 and a rotary axle output 34 which is provided with attachment structure 36 for receiving an abrasive blade 38. Pneumatic motor 30 may be one which is commercially available, and in a preferred embodiment of the present invention, pneumatic motor 30 is one selected to operate at 25,000 R.P.M. and is commercially available from Starlight Industries on Lancaster Avenue in Rosemont, Pa. Preferably, compressed air in a range of around 90 p.s.i. may be utilized, but compressed air of as low as 45 p.s.i. may be utilized. However, it is understood that other suitable pneumatic motors may be utilized. Pneumatic motor 30 provides increased rotational speed, decreased weight and size, and increased safety as compared to an electrical motor insofar as its adaptability to the present invention. Pneumatic motor 30 is preferably mounted within an opening 40 in carriage 14 and is held firmly in position by means of set screw 42. The position of pneumatic motor 30 is adjustable in the direction of double headed arrow 44 by means of loosening and tightening set screw 42.

Abrasive blade 38 may be comprised of a suitable abrasive substance. Preferably, in the embodiment as illustrated in FIGS. 1 through 3 for the purpose of shaping glass by cutting, blade 38 would preferably be comprised of a suitable disk material provided with diamond abrasive on its periphery. Such blades are commercially available and are commercially available from Starlight Industries identified above.

In the cutting of glass, it is highly desirable to provide a means of cooling the glass at the point of cutting during the cutting operation. Although other coolants may be used, water is a preferred coolant due to its being readily available at most locations, is inexpensive, and does not require a complicated cleaning up procedure. As illustrated in FIGS. 1 and 2, portable apparatus 10 is provided with a tube 46 having a flared end 48. Water is caused to flow through tube 46 in the direction of arrow 50 and is sprayed through flared end 48 at the location where blade 38 is cutting through glass plate 12. The coolant is highly desirable due to the amount of heat generated by the abrasive cutting operation.

A protective shield or cover (not shown) may be mounted over abrasive blade 38 as an added safety feature. Preferably, any such cover or shield to be mounted over abrasive blade 38 would be comprised of a transparent synthetic plastic material, although this is not essential. Further, carriage 14 may be provided with one or more handles (not shown) for moving the carriage along track 20, although this is not necessary.

In operation, glass plate 12 may be placed on a table 52 or other suitable structure. However, generally, no special structure or table is required. Track 20 is positioned on glass plate 12 at a predetermined distance from the desired line of cutting. Portable apparatus 10 is placed on track 20 with guide means or guide wheels 22 and 24 in engagement with the rising portion of track 20. With water supplied to tube 46 and compressed air supplied to inlet 32 of pneumatic motor 30, carriage 14 is moved along track 20 cutting glass plate 12 in the desired manner.

Figure 5:
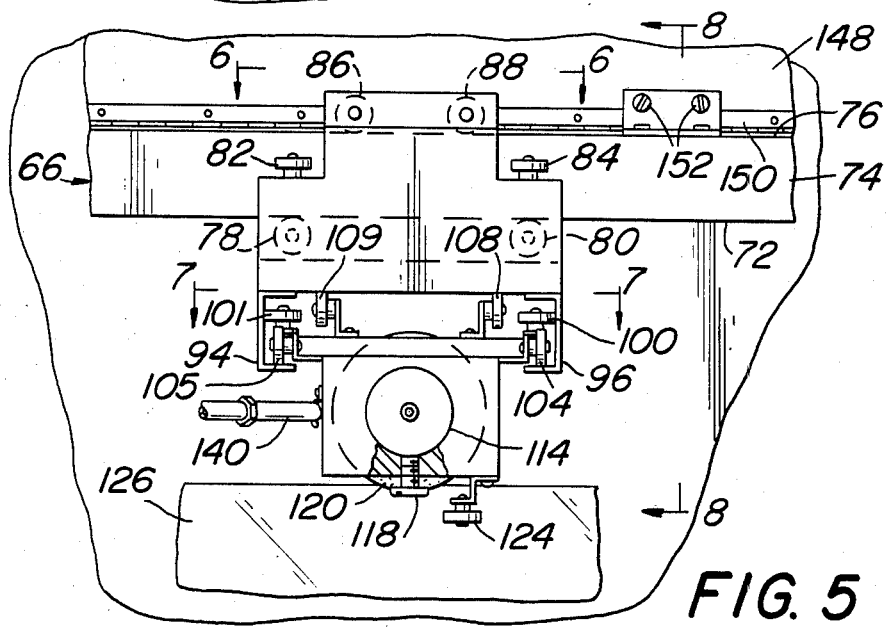
FIG. 5 is a plan view of the portable apparatus for shaping glass shown in FIG. 4 with certain internal structure shown therein in phantom.

Referring now to FIGS. 4 through 8, there is shown another embodiment of the present invention in which a portable apparatus 60 is comprised of a carriage 62 having a first portion 64 adapted to ride on track 66 and a second portion 68 adapted to carry a pneumatic motor 70. Second portion 68 of carriage 62 is adapted to move in a direction perpendicular to the direction of the movement of first portion 64 of carriage 62 on track 66.

Track 66 is provided with three substantially orthogonal surfaces 72, 74 and 76. Three orthogonal sets of guide means or wheels on first portion 64 of carriage 62 engage the three orthogonal surfaces of track 66. Specifically, guide means or wheels 78, 79, 80 and 81 engage surface 72 of track 66; guide means or guide wheels 82 and 84 engage orthogonal surface 74 of track 66 and guide means or guide wheels 86 and 88 engage orthogonal surface 76 of track 66. Carriage 62 is movable in the directions of double-headed arrow 90 along track 66.

Second portion 68 of carriage 62 is movable in the directions of double-headed arrow 92, which is in a direction perpendicular to that of double-headed arrow 90. Second portion 68 of carriage 62 is provided with a set of guide means or guide rollers that ride in a guide way formed on first portion 64 of carriage 62. The guide way is comprised of "U" shaped members 94 and 96 along with surface 98 of first portion 64. As may be best seen in FIG. 7, taken in combination with the other figures, the set of guide means or guide rollers on second portion 68 is comprised of rollers 100 through 111. Rollers 100 through 104 prevent lateral movement in the direction of double headed arrow 90 of second portion 68 within the guide way formed by "U" shaped members 94, 96 and surface 98. Guide means or guide rollers 104 through 111 restrain movement in the direction of double headed arrow 112. However, it is understood that other suitable types of guide means may be utilized including the use of a ball bearing type mechanism mounted in a guide way.

Pneumatic motor 114 is carried by second portion 68 of carriage 62. Pneumatic motor 114 is provided with a compressed air inlet 116 and may be substantially identical to pneumatic motor 30 as described previously. Pneumatic motor 114 may be retained by set screw 118 and is adjustable in the directions of double-headed arrow 92 by loosening set screw 118 and moving motor 114 in the desired direction, and then tightening set screw 118.

As shown in FIGS. 4 through 8, portable apparatus 60 is provided with a disk shaped blade 120 which is provided with a selected shape on its periphery as may be best seen in FIGS. 7 and 8. The shape shown in FIGS. 7 and 8 is a concave semicircular shape in cross-section. However, it is understood that various other types of shapes may be utilized including that of a triangle or curves of various other radii. The concave semicircle in cross-section is shown at 122 in FIGS. 7 and 8. The blade 120 may be made of a suitable abrasive material, and preferably, for glass cutting operations, blade 120 is provided with a diamond abrasive on the cutting edge periphery.

Portable apparatus 60 is provided with guide stop 124 which may be utilized to guide the portable apparatus to maintain the abrasive disk 120 in the proper location with respect to the edge of glass plate 126 or it may be utilized as a stop in the doubling operation described more fully herein after with respect to FIG. 9. Guide stop 124 is preferably in the form of a roller as shown in FIGS. 4 through 10. However, it is understood that other forms of a guide stop may be utilized, including those which do not utilize moving parts, such as a low friction projecting member.

An alternative embodiment of guide means 124 is shown in FIG. 10. In the embodiment shown in FIG. 10, a guide roller 128 is mounted on member 30. Member 130 is adjustably mounted to member 132 by means of a releasable fastener 134 which may be in the form of a screw. In this manner, guide means or roller 128 is adjustable in the direction of double-headed arrow 138.

As described previously with respect to the embodiment of FIGS. 1 through 3, portable apparatus 60 is provided with a fluid coolant spray assembly comprised of tube 140 having a flared end 142. A fluid coolant, preferably water, is supplied to tube 140 in the direction of arrow 144 and applied at the cutting edge of abrasive cutting wheel 120 through flared end 142.

Track 66 is comprised of a first member 146 and a second member 148 which are connected together by a hinge 150 with the position of member 146 being adjustable with respect to member 148. When portable apparatus 160 is utilized for edge rounding or pencil edging as it is known in the art, track member 146 may be locked with respect to track member 48 by means of set screws 152.

The portable apparatus 60 may be utilized for beveling as shown in FIG. 9 by adjusting track member 146 with respect to 148 after releasing set screw 152. In the beveling operation, an abrasive blade 154 having abrasive on the side surface thereof is attached to pneumatic motor 114. The abrasive on blade 154 may preferably be a diamond abrasive for use in glass cutting.

When portable apparatus 60 is utilized in the beveling operation, glass plate 156 is preferably raised from the table or work surface by a spacer 160.

In the beveling operation, guide/stop 124 may be utilized to limit the depth to which the beveling operation takes place. In other words, once the roller of guide/stop means 124 may be utilized to limit the depth to which the beveling operation takes place. In other words, once the roller of guide/stop means 124 contacts glass plate 156, abrading disk or blade 154 cannot cut or abrade any deeper into plate 156. In this manner, a uniform beveled edge may be obtained along the entire length of glass plate 156 with ease.

It is understood that various modifications and changes may be made to the structure illustrated herein within the scope and spirit of the present invention. For example, the shape of the carriages disclosed herein may be varied in numerous ways without affecting the structural relationships necessary to carry the pneumatic motor. Furthermore, various types of guide ways may be utilized. Various modifications may be made in the form and structure of the tracks. The guide rollers and other types of guide means may be utilized to perform the same function within the spirit of the present invention. Numerous other changes and modifications will be apparent to those skilled in the art.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. A portable apparatus for shaping glass by abrasion, comprising:
   a carriage, said carriage being comprised of a first portion and a second portion and being provided with a plurality of guide means;
   a track comprising a first member and a second member, said first member being hingedly attached to said second member and adapted to receive the guide means of the first portion of said carriage, said first member being adjustable about said hinge with respect to said second member, said guide means of said carriage engaging said track to move along said track;
   a pneumatic motor carried by said carriage;
   said first portion of said carriage being adapted to ride on said track, said second portion of said carriage being adapted to carry said pneumatic motor, said second portion of said carriage being movable on said first portion of said carriage in a direction perpendicular to the direction of movement of said first portion of said carriage on said track;
   an abrasive blade driven by said pneumatic motor for rotation; and,
   fluid coolant spray means carried by said carriage and adapted to spray fluid coolant at the abrading surface of said cutting blade during glass abrading operations.

2. A portable apparatus in accordance with claim 1 wherein said guide means is comprised of rollers.

3. A portable apparatus in accordance with claim 1 wherein said carriage is provided with an opening for mounting said pneumatic motor therein and means for releasably retaining said pneumatic motor therein.

4. A portable apparatus in accordance with claim 3 wherein the position of said pneumatic motor within said opening in said carriage is adjustable.

5. A portable apparatus in accordance with claim 1 wherein the abrasive of said abrasive blade is comprised of diamond abrasive for glass cutting.

6. A portable apparatus in accordance with claim 1 wherein said blade is in the shape of a disk with a glass cutting abrasive surface on the periphery of said disk.

7. A portable apparatus in accordance with claim 6 wherein said guide means are comprised of rollers.

8. A portable apparatus in accordance with claim 6 wherein said coolant spray means comprises a tube connected to a water supply, said tube being provided with a flared outlet directed at the periphery of the disk shaped glass cutting abrasive blade.

9. A portable apparatus in accordance with claim 1 wherein said second portion of said carriage is provided with a second set of guide means that ride in a guide way on the first portion of said carriage.

10. A portable apparatus in accordance with claim 1 wherein said second portion of said carriage is provided with a guide-stop means for engaging glass being shaped.

11. A portable apparatus in accordance with claim 1 wherein said first member of said track is provided with three substantially orthogonal surfaces and said first portion of said carriage is provided with guide means in three substantially orthogonal planes to ride on said three substantially orthogonal surfaces.

12. A portable apparatus in accordance with claim 9 wherein said second portion of said carriage is provided with guide means in three substantially orthogonal planes to run in said guide way on said first portion of said carriage.

13. A portable apparatus in accordance with claim 1 wherein said glass cutting abrasive blade is comprised of a disk with a periphery having a predetermined shape of glass cutting abrasive.

14. A portable apparatus in accordance with claim 13 wherein said predetermined curved shape is comprised of a semicircular shape and cross section.

15. A portable apparatus in accordance with claim 1 wherein said glass cutting abrasive blade is comprised of a disk with glass cutting abrasive on at least one side surface of said disk.

16. A portable apparatus in accordance with claim 9 wherein said second set of guide means is comprised of a set of rollers.

17. A portable apparatus in accordance with claim 10 wherein said guide stop means is comprised of a roller.

* * * * *